US005481793A

United States Patent [19]
McClure

[11] Patent Number: 5,481,793
[45] Date of Patent: Jan. 9, 1996

[54] HOOK AND BOLT TYPE BOILER WALL TUBE TOOL

[76] Inventor: Gary W. McClure, Rte. 7, Box 228A, South Charleston, W. Va. 25309

[21] Appl. No.: 235,790

[22] Filed: Apr. 29, 1994

[51] Int. Cl.[6] .................................................. B23P 15/26
[52] U.S. Cl. ............................ 29/726; 29/272; 228/49.3
[58] Field of Search ...................... 29/272, 726, 890.031, 29/890.043, 890.054; 228/44.5, 49.3, 119, 183; 269/153, 234, 265, 902

[56] References Cited

U.S. PATENT DOCUMENTS

| 4,493,139 | 1/1985 | McClure . |
| 4,579,272 | 4/1986 | McClure . |
| 4,722,468 | 2/1988 | McClure . |
| 4,846,391 | 7/1989 | McClure . |
| 4,936,500 | 6/1990 | McClure . |

FOREIGN PATENT DOCUMENTS

| 659331 | 4/1979 | U.S.S.R. | ................................ 228/49.3 |
| 988510 | 1/1983 | U.S.S.R. | ................................ 228/49.3 |

Primary Examiner—David P. Bryant
Attorney, Agent, or Firm—Jacobson, Price, Holman & Stern

[57] ABSTRACT

A boiler wall tube tool for clamping together adjacent ends at a juncture of a boiler wall tube in a boiler wall. The tool includes first and second opposing clamping members, each clamping member including a recess suitable for engaging an exterior surface of a tube and for extending across the juncture of a tube. A pair of slots which are spaced from each other and substantially aligned with the slots on the other clamping member are provided in each clamping member. The slots on the first clamping member include sloped edges terminating at an outer portion thereof. A hook-and-bolt member secures the clamping members around the tube segments. The hook-and-bolt member includes a pair of hook arms for extending through the slots of the clamping members and suitable for passing through a spacing between laterally adjacent boiler tubes. Each end of the hook arms terminates in hooked ends for engaging the sloped edges on the slots of the first clamping member. A bolt passing through threads in the handle engages a front face of the second clamping member and applies force to pull the first clamping member towards the second clamping member.

17 Claims, 1 Drawing Sheet

HOOK AND BOLT TYPE BOILER WALL TUBE TOOL

BACKGROUND OF THE INVENTION

1. Field of the Invention

The present invention relates to a tool for clamping ends of boiler wall tubes in alignment so that the ends of the tubes may be welded together. More particularly, the present invention relates to a boiler wall tube tool designed for use in boiler tube walls having closely spaced laterally adjacent tubes.

2. Prior Art

Several boiler wall tube tools have been designed by the same inventor as that of the present invention. These designs are the subject of U.S. Pat. Nos. 4,846,391; 4,936,500; 4,722,468; 4,579,272 and 4,493,139. Some boiler walls are constructed such that the spacing between adjacent tubes is very small. In these tools, bolts are used to pass through the spacing between the tubes to tighten the clamping members around the ends of the tube. The bolts have a sufficient diameter to provide the force and strength to tighten the clamping members securely. These bolts cannot fit through the spacing in some boiler tube walls. Therefore, a tool is needed for boiler walls having closely spaced tubes.

SUMMARY OF THE INVENTION

The present invention is directed to a boiler wall tube tool designed to clamp together ends of a tube without the need for a bolt to pass through the spacing between the laterally adjacent tubes. Specifically, the tool according to the present invention comprises two opposing clamping members which fit onto opposite sides of a boiler wall tube and extend across a juncture of two segments of the tube which are to be welded together. The clamping members are tightened around the tube by a hook-and-bolt member.

Each clamping member includes two laterally spaced slots which allow the arms of the hook-and-bolt member to pass therethrough. One clamping member, designated the inside clamping member, has sloped edges in each hook arm slot. The hooked ends of the hook-and-bolt member engage the sloped edges and prevent the arms from pulling through the slots of the inside clamping member.

Furthermore, the hook-and-bolt member includes a tensioning bolt which is threaded through a handle end of the hook-and-bolt member. The tensioning bolt is rotated to extend against a bolt stop on an exterior surface of the outer clamping member to apply tensioning force that draws the inner and outer clamping members together around the boiler wall tube.

Each clamping member has a window aperture which provides access to the juncture of the tube segments for welding the tube segments together. Further, the sloped edges of the slots on the inner clamping member are at the top and outside end of the slots so that the hook-and-bolt member can engage the slope edges only if the clamping members are positioned in a proper orientation. This prevents the clamping member from being assembled around the tube incorrectly.

It is a primary object of the present invention to provide a boiler wall tube tool capable of clamping together ends of a tube in a boiler tube wall without the passage of a bolt in the spacing between tubes.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE DRAWINGS

Figure 1:
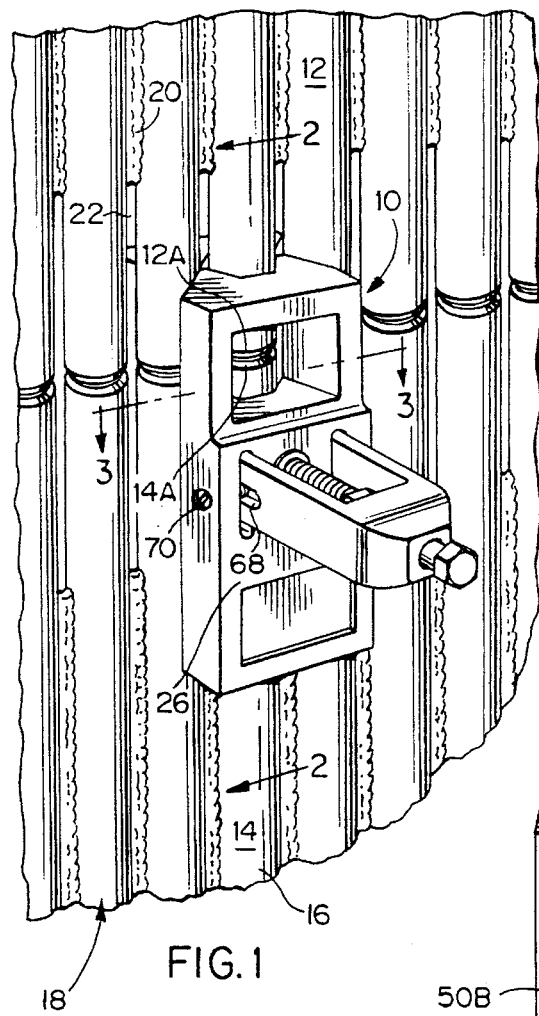
FIG. 1 is a perspective view of the boiler wall tube tool installed around a tube of a boiler wall, in accordance with the present invention.

Referring to the FIGS. 1–5, the boiler wall tube tool is generally shown at 10, and is used to clampingly secure the ends 12A and 14A of tube segments 12 and 14. When welded together, the tube segments 12 and 14 define a tube 16. The boiler wall 18 comprises a plurality of laterally spaced tubes 16 which are closely spaced together and connected by webs 20. When welding the tube segments 12 and 14 together, it is necessary that the segments be securely clamped together in aligned relation during the welding process. When the tool 10 is used, the web 20 is removed between adjacent tubes near the ends 12A and 14A of the segments 12 and 14. The tool is also useful in repairing boiler tubes in a similar manner.

In some boiler walls, the lateral spacing between adjacent tubes is so small that other boiler wall tube tools, such as those disclosed in prior U.S. Pat. No. 4,936,500, are not useful because there is not enough spacing to allow passage of a bolt to secure the clamping members together. Thus, the tool 10 according to the present invention is designed to be utilized on such boiler walls, but it should be understood that it is also useful on other boiler walls that do not have the closely spaced adjacent tubes.

Figure 3:
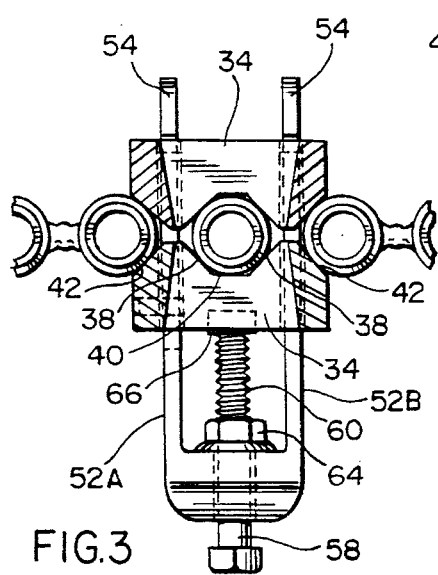
FIG. 3 is a cross-sectional view taken through line 3—3 of FIG. 1.
Figure 4:
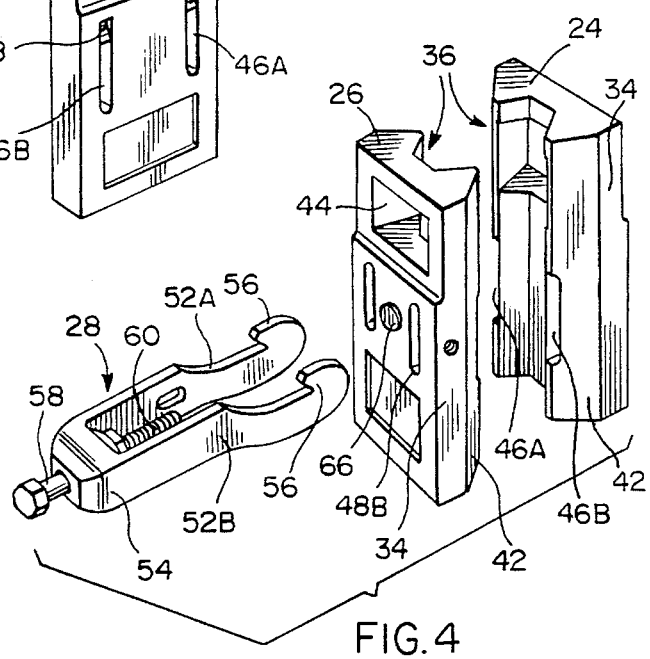
FIG. 4 is a perspective view of the tool in a disassembled form.

The tool 10 comprises an inner clamping member 24, an outer clamping member 26 and a hook-and-bolt member 28 for tightening the clamping members 24 and 26 together around the juncture of tube segments 12 and 14. The clamping members 24 and 26 are substantially identical and each comprises an elongated, substantially rectangular body 34. Each clamping member has an inner recess 36 having a pair of outwardly sloping surfaces 38 and a straight surface 40, which are suitable for closely surrounding the exterior surface of a tube 16. Thus, the inner recess has a polygonal profile as shown in FIG. 3. In addition, each clamping member has a pair of external sloped edges 42 which are suitable for engaging a laterally adjacent tube. The sloped surfaces 38 together with the outer sloped edges 42 serve to fit partially into the spacing between laterally adjacent tubes.

Figure 5:
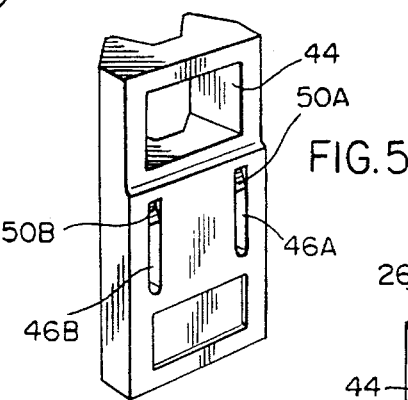
FIG. 5 is a perspective view of the outer side of the inner clamping member, and illustrating the sloped edges in the slots.

As it is the purpose of the tool to facilitate welding of the tube segments 12 and 14 together, each clamping member 24 and 26 comprises a window aperture 44 to provide access to the juncture of tube ends 12A and 14A. Furthermore, the clamping member 24 includes a pair of slots 46A and 46B and the clamping member 26 has a pair of slots 48A and 48B. As best shown in FIG. 5, the slots 46A and 46B have sloped top edges 50A and 50B, respectively, at the outer side of the clamping member 24, the purpose for which is explained below.

Figure 2:
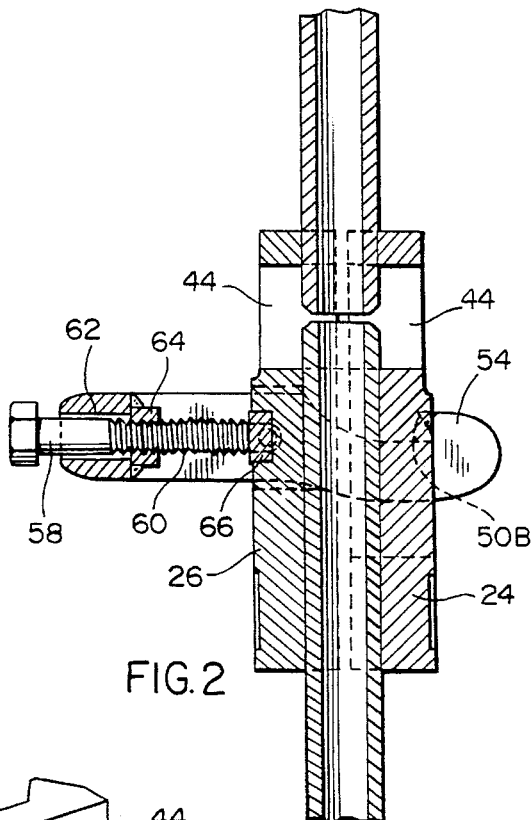
FIG. 2 is a cross-sectional view taken through line 2—2 of FIG. 1.

As illustrated in FIGS. 1–3, the clamping members 24 and 26 are oriented on opposite sides of the juncture of the ends 12A and 14A, with the window 44 of each clamping member positioned over the juncture. The clamping members are secured together and tightened around the tube segments 12 and 14 by a hook-and-bolt member 28. The hook-and-bolt member 28 comprises arms 52A and 52B and a handle 54. Each arm terminates in a hooked end 56 which hooks backwards towards the handle 54.

The hook-and-bolt member 28 further comprises a bolt 58 having threads 60 which passes through a hole 62 in the handle 54 and through a threaded nut 64 integrally formed, or attached to an inner wall of the handle 54. The bolt 58 is movable through the threaded nut 64 to engage a bolt stop 66 on the front face of the outer clamping member 26. Each arm of the hook-and-bolt member preferably has a slot 68 (only one slot is shown in FIG. 1) to receive a retaining screw or bolt (not shown) that threads through an aligned hole 70 on the side of the clamping member. The retainer screw or bolt holds the hook-and-bolt member 28 on the clamping members to keep the assembly together when not in use.

In use, the clamping members 24 and 26 are appropriately positioned around a juncture of tube segments as shown in FIGS. 1–3. The window 44 of each clamping member is aligned with the juncture on opposite sides thereof. The arms 52A and 52B of the hook-and-bolt member 28 are inserted through the slots 48A and 48B of the outer clamping member 26, through the spacing between the adjacent tubes, and through the slots of the inner clamping member 24. The hooked ends 56 of the arms 52A and 52B are engaged around the sloped edges 50A and 50B, respectively. Then, the bolt 58 is rotated to engage the bolt stop 66. As the bolt moves against the bolt stop 66, the hooked ends 56 of the arms 52A and 52B pull the inner clamping member 24 towards the outer clamping member 26, and force the clamping members together around the tube segments. The bolt 58 is adjusted to apply sufficient pressure to securely clamp the clamping members around the tube segments. Once the clamping members are secure, a welding device is positioned through the window 54 of each clamping member to weld the tube ends 12A and 14A together. When each side of the tube segments is welded, the bolt 58 is loosened and the hook-and-bolt member is withdrawn from the slots of the clamping members. The clamping members are then removed from the tube segments, and reapplied to weld tube segments on another tube.

The structure of the clamping members 24 and 26, and the position of the sloped edges 50A and 50B of the slots 46A and 46B are such that the clamping members cannot be assembled incorrectly around the tube. Specifically, the hooked ends 56 of the hook-and-bolt member arms 52A and 52B will only engage the sloped edges 50A and 50B when the clamping members are properly positioned as shown in FIG. 2. If one clamping member is facing the wrong direction, the hook-and-bolt member will not function properly. Moreover, the location of the bolt stop on the front face of the outer clamping member assists the user in properly positioning the clamping members.

It is to be understood that the tool 10 is for use on boiler tube walls particularly, but not limited to, those with minimal spacing between adjacent tubes. For example, a boiler tube wall having a 1/8 inch spacing between tubes requires the tool of the present invention. The tool is also useful on boiler tube walls having tube spacings as much as 3/8 inch or more. In this regard, the tool 10 is optionally dimensioned to be utilized on boiler tube walls having any tube spacing.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A boiler wall tube tool for clamping together adjacent ends of boiler wall tube segments in a boiler wall, the tool comprising:

first and second opposing clamping members, each clamping member including a recess suitable for engaging an exterior surface of adjacent ends of boiler wall tube segments, each clamping member comprising slot means extending through the clamping member; and means for tightening the clamping members extending through the slot means of one clamping member and suitable for passing through a spacing between laterally adjacent boiler wall tubes and extending through the slot means of the other clamping member, said means for tightening comprising means for locking onto one of the clamping members and means for applying clamping force against the means for locking to draw and secure the clamping members together, wherein the slot means of each clamping member comprises a pair of spaced slots, the first clamping member having sloped edges on an upper portion of the spaced slots, the means for tightening comprises a hook-and-bolt member comprising two spaced hook arms suitable for extending through the slots of the clamping members and a support handle joining the spaced hook arms which is substantially transverse to the hook arms, said means for locking comprises hooked ends on each of said hook arms for engaging the sloped edges on the first clamping member, and said means for applying force comprises a bolt which is threadably received in said support handle and is rotated to engage an outer surface of the second clamping member and apply pulling force to the hook arms and thereby pull the first clamping member towards the second clamping member.

2. The tool of claim 1, and further comprising a window aperture in each of said clamping members which is suitable for providing access to the juncture of the adjacent ends of the boiler wall tube.

3. The tool of claim 1, wherein the recess of each clamping member comprises two sloped surfaces joined by a straight surface suitable for surrounding and engaging an exterior surface of the tube.

4. The tool of claim 1, wherein the clamping members further comprise external sloped surfaces outside of said recess suitable for engaging a laterally adjacent tube.

5. In combination with a boiler tube wall formed by a plurality of closely spaced tubes rigidly connected by webs, a tool for clampingly engaging adjacent ends of tube segments and retaining the adjacent ends in alignment while the tube segments are welded together, the tool comprising first and second opposing clamping members, each clamping member including a recess suitable for engaging an exterior surface of adjacent ends of boiler wall tube segments, each clamping member comprising slot means extending through the clamping member; and means for tightening the clamping members extending through the slot means of one clamping member and suitable for passing through a spacing between laterally adjacent boiler wall tubes and extending through the slot means of the other clamping member, said means for tightening comprising means for locking onto one of the clamping members and mean for applying clamping force against the means for locking to draw and secure the clamping members together, wherein the slot means of each clamping member comprises a pair of spaced slots, the first clamping member having sloped edges on an upper portion of the spaced slots., the means for tightening comprises a hook-and-bolt member comprising two spaced hook arms suitable for extending through the slots of the clamping members and a support handle joining the spaced hook arms which is substantially transverse to the hook arms, said means for locking comprises hooked ends on each of said hook arms for engaging the sloped edges on the first clamping member, and said means for applying force comprises a bolt which is threadably received in said support handle and is rotated to engage an outer surface of the second clamping member and apply pulling force to the arms and thereby pull the first clamping member towards the second clamping member.

6. A boiler wall tube tool for clamping together adjacent ends of boiler wall tube segments in a boiler wall, the tool comprising:

first and second opposing clamping members, each clamping member including a recess suitable for engaging an exterior surface of the adjacent ends of the boiler wall tube segments, each clamping member comprising a pair of slots which are spaced from each other, the slots on the first clamping member comprising sloped edges terminating at an outer portion of the first clamping member; and a hook-and-bolt member comprising a pair of hook arms for extending through the slots of the clamping members and suitable for passing through a spacing between laterally adjacent boiler tubes, said hook-and-bolt member comprising a handle connecting the hook arms together and substantially transverse to the hook arms, each end of the hook arms terminating in hooked ends for engaging the sloped edges on the slots of the first clamping member, and a bolt passing through threads in the handle for engaging a front face of the second clamping member and applying force to pull the first clamping member towards the second clamping member.

7. A boiler wall tube tool for clamping together adjacent ends of boiler wall tube segments in a boiler wall, the tool comprising:

first and second opposing clamping members, each clamping member including a recess suitable for engaging an exterior surface of adjacent ends of boiler wall tube segments, each clamping member comprising slot means extending through the clamping member; and means for tightening the clamping members extending through the slot means of one clamping member and suitable for passing through a spacing between laterally adjacent boiler wall tubes and extending through the slot means of the other clamping member, said slot means of said other clamping member including a sloped edge on a portion of the slot means and said means for tightening comprising means for locking onto said sloped edge and means for applying clamping force against the means for locking to draw and secure the clamping members together.

8. The tool of claim 7, and further comprising a window aperture in each of said clamping members which is suitable for providing access to the juncture of the adjacent ends of the boiler wall tube segments.

9. The tool of claim 7, wherein the slot means of each clamping member comprises a pair of spaced slots, the first clamping member having a sloped edge on an upper portion of each of the spaced slots, the means for tightening comprises a hook-and-bolt member comprising two spaced hook arms suitable for extending through the slots of the clamping members and a support handle joining the spaced hook arms which is substantially transverse to the hook arms, said means for locking comprises hooked ends on each of said hook arms for engaging the sloped edges on the first clamping member, and said means for applying force comprises a bolt which is threadably received in said support handle and is rotated to engage an outer surface of the second clamping member and apply pulling force to the hook arms and thereby pull the first clamping member towards the second clamping member.

10. The tool of claim 7, wherein the recess of each clamping member comprises two sloped surfaces joined by a straight surface suitable for surrounding and engaging an exterior surface of the tube segments.

11. The tool of claim 7, wherein the clamping members further comprise external sloped surfaces outside of said recess suitable for engaging a laterally adjacent tube.

12. The tool of claim 7, wherein said means for locking includes a hooked end for engaging said sloped edge on said other clamping member.

13. The tool of claim 12, wherein said hooked end extends at an acute angle with respect to said means for tightening.

14. In combination with a boiler tube wall formed by a plurality of closely spaced tubes rigidly connected by webs, a tool for clampingly engaging adjacent ends of boiler wall tube segments and retaining the adjacent ends in alignment while the tube segments are welded together, the tool comprising first and second opposing clamping members, each clamping member including a recess suitable for engaging an exterior surface of the adjacent ends of the boiler wall tube segments, each clamping member comprising slot means extending through the clamping member, and means for tightening the clamping members extending through the slot means of one clamping member and suitable for passing through a spacing between laterally adjacent boiler wall tubes and extending through the slot means of the other clamping member, said slot means of said other clamping member including a sloped edge on a portion of the slot means and said means for tightening comprising means for locking onto said sloped edge and means for applying clamping force against the means for locking to draw and secure the clamping members together.

15. The combination of claim 14, wherein the slot means of each clamping member comprises a pair of spaced slots, the first clamping member having sloped edge on an upper portion of each of the spaced slots, the means for tightening comprises a hook-and-bolt member comprising two spaced hook arms suitable for extending through the slots of the clamping members and a support handle joining the spaced hook arms which is substantially transverse to the hook arms, said means for locking comprises hooked ends on each of said hook arms for engaging the sloped edges on the first clamping member, and said means for applying force comprises a bolt which is threadably received in said support handle and is rotated to engage an outer surface of the second clamping member and apply pulling force to the hook arms and thereby pull the first clamping member towards the second clamping member.

16. The tool of claim 14, wherein said means for locking includes a hooked end for engaging said sloped edge on said other clamping member.

17. The tool of claim 16, wherein said hooked end extends at an acute angle with respect to said means for tightening.

* * * * *